United States Patent [19]

Violette

[11] 4,061,391
[45] Dec. 6, 1977

[54] DRUM SUPPORTING CARRIAGE

[76] Inventor: Theodore T. Violette, 2603 Wall St., Long Beach, Calif. 90804

[21] Appl. No.: 720,755

[22] Filed: Sept. 7, 1976

[51] Int. Cl.² .............................................. B60P 7/00
[52] U.S. Cl. ...................................... 296/4; 105/463; 280/179 A
[58] Field of Search .................. 296/4, 179 R, 179 A; 105/463, 466, 486

[56] References Cited
U.S. PATENT DOCUMENTS 3,146,017   8/1964   Yeary ........................................ 296/4

Primary Examiner—Philip Goodman
Attorney, Agent, or Firm—William C. Babcock

[57] ABSTRACT

A left truck engageable carriage that removably supports a number of stocks of cylindrical drums in side by side abutting contact to provide a unitized assembly that may be transported as such on a flat bed truck or flat car. The carriage is particularly adapted for use with empty drums and minimizes the individual handling of the latter as they are returned by users to a facility for cleaning and refurbishing, as well as minimizing handling when the cleaned drums are forwarded to a user for filling with a desired liquid product.

7 Claims, 7 Drawing Figures

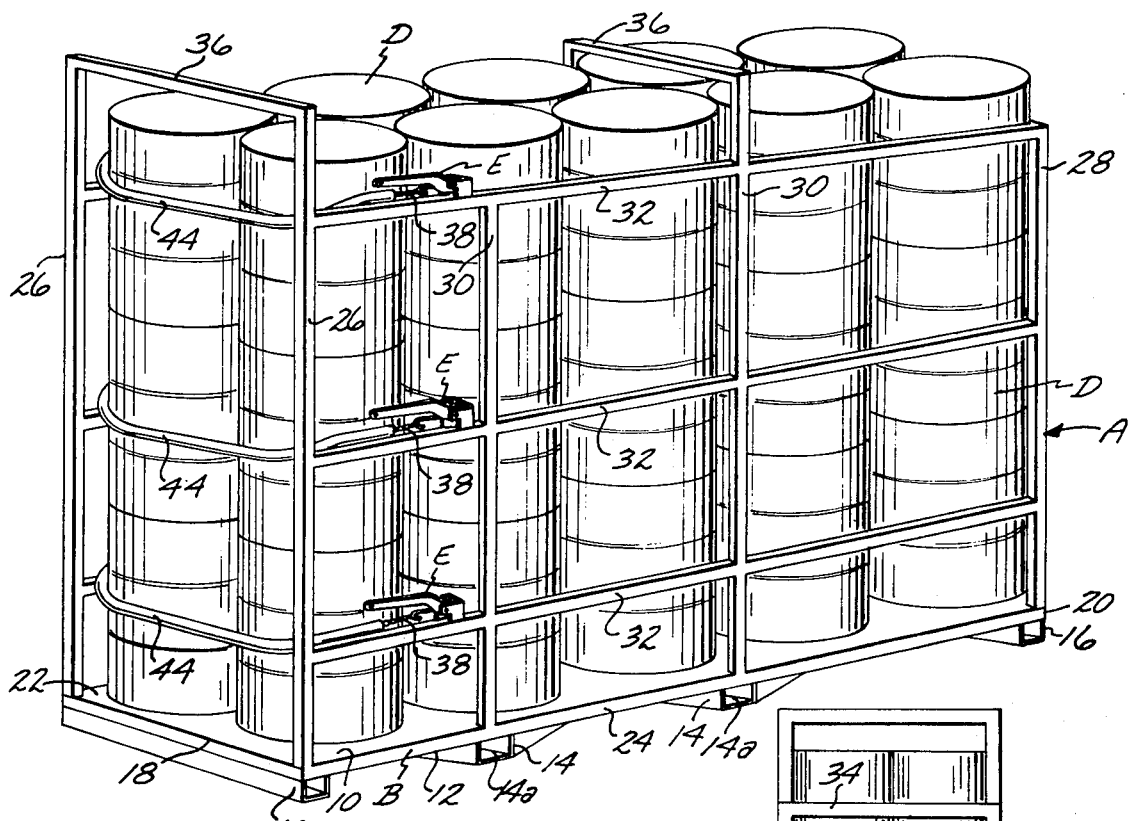
FIG.1
FIG.2
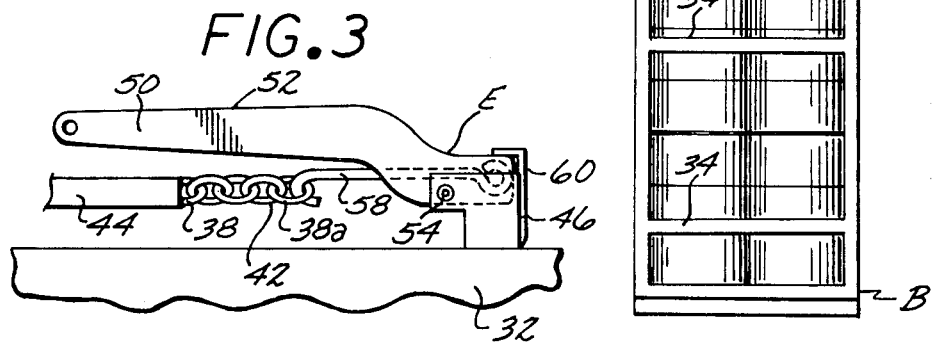
FIG.3
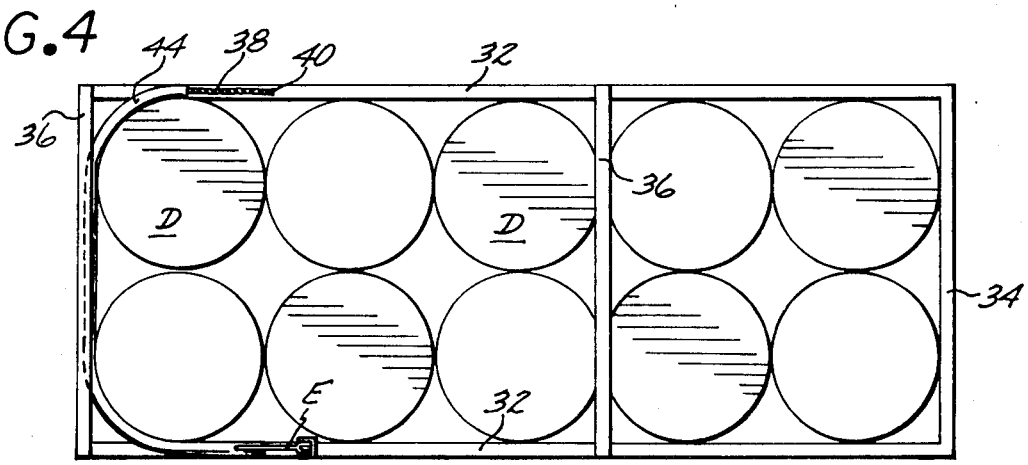
FIG.4

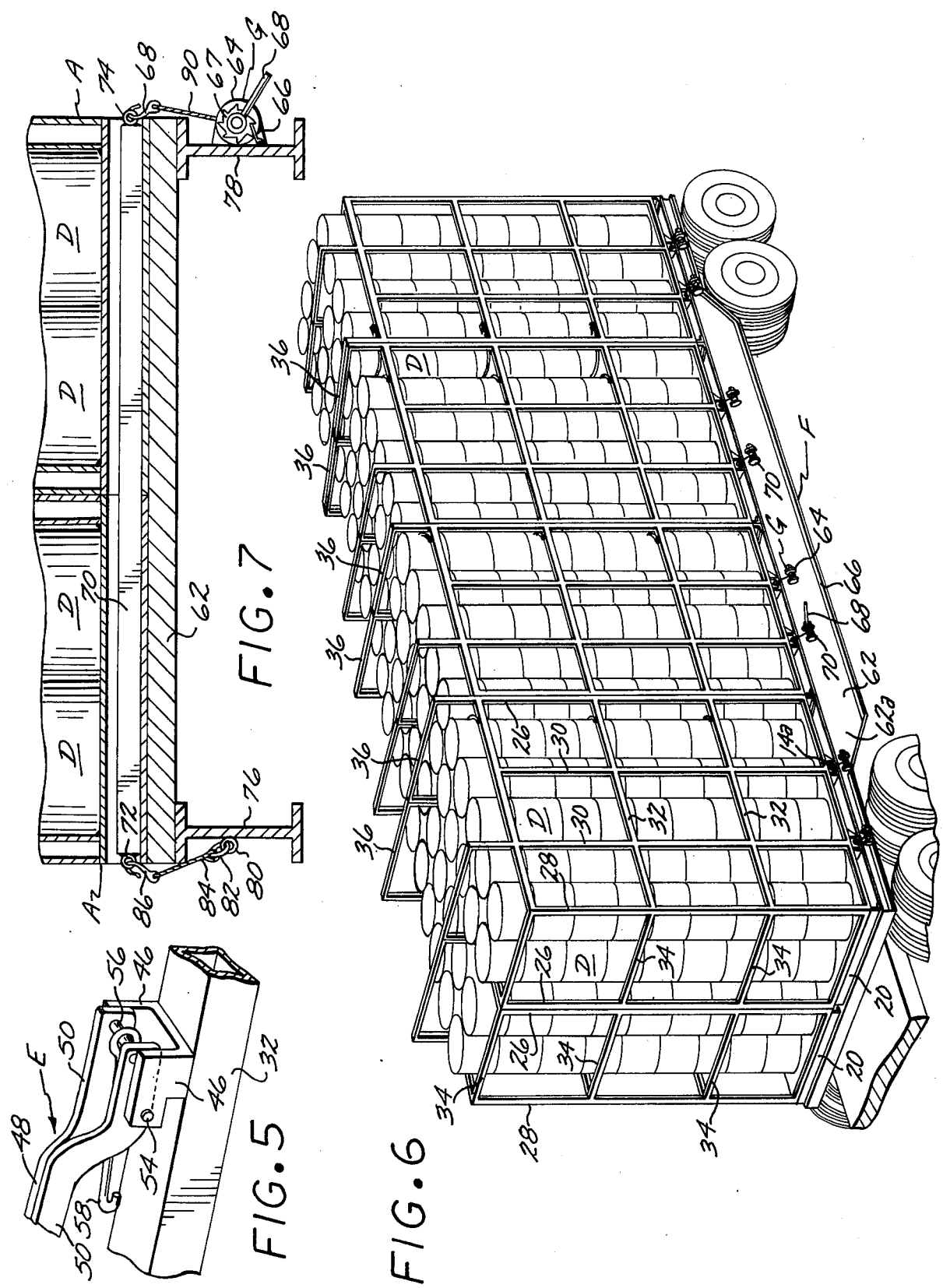

DRUM SUPPORTING CARRIAGE

BACKGROUND OF THE INVENTION

1. Field of the Invention

Drum supporting carriage.

2. Description of the Prior Art

In the past, excessive labor costs have been involved in the handling of drums in the 55 gallon size whether initially with new drum deliveries and receiving, or as they are returned by a user to a facility for cleaning and refurbishing prior to again being used. Also, excessive labor costs are involved in the handling of the drums after they have been cleaned and are forwarded to a manufacturer or packaging facility for filling with a desired liquid product.

A major object of the present drum supporting carriage that may be moved by a conventional fork lift truck is to reduce individual drum handling labor, minimize wear on the drums by chafing and denting, maintain the drums in an attractive condition, and substantially reduce the time and labor involved in loading the drums on and removing the drums from a vehicle that is used in transporting the drums.

Another object of the invention is to limit the handling of the drums to the operator of a fork lift vehicle and the driver of the flat bed vehicle used in transporting the carriage and drums as a unitized assembly.

A further object of the invention is to minimize the time required in the flow from a cleaning facility to a filling station to a customer, and minimizing the possibility of loose drum counting errors.

A further object of the invention is to eliminate three to five drum handling laborers to unload a truck and stock the drums, to reduce the hazard of injuries that is inherent in the manual handling of drums, eliminate drum stacking tunnage and chocking materials, reduce the area required to store drums, and reduce the incidence of drums being stolen or pilfered.

Yet another object of the invention is to confine empty drum handling to a one man left truck operation, and increase the speed at which the drum filling operations may be conducted.

Another object of the invention is to sustain the containment of empty drums before and subsequent to drum containment of the product and drum handling within the existent operational pattern of the drum supplier and user's facilities.

SUMMARY OF THE INVENTION

The fork lift engageable carriage includes a rectangular rigid base that has first and second ends and first and second sides. First and second pairs of laterally spaced uprights extend upwardly from the first and second ends. A number of vertically spaced pairs of first drum retaining strips extend longitudinally between the first and second pairs of uprights and are rigidly secured thereto. A number of second vertically spaced drum retaining strips extend transversely between the second pair of uprights. One or more pairs of third uprights are secured to the first and second sides of the base and are situated intermediate the first and second uprights, with the third uprights being rigidly secured to the first pairs of drum retaining strips.

The empty drums are moved onto the base by passing between the first pair of uprights and then being disposed in stocks, which stocks are in abutting contact. A number of vertically spaced chains that have first and second ends are provided, and with the major portions of the chains situated in a pliable sheath. The first ends of the chains are held in fixed positions relative to the first upright most adjacent the first side of the base. The second ends of the chains may engage manually operated toggle mechanisms, which mechanisms occupy fixed positions relative to the first upright most adjacent the second side of the base. When the chains are in engagement with the toggle mechanism and the latter is actuated, the chains are transversely positioned and in pressure contact with the drums in the stocks of drums most adjacent the first end of the base. As the drums are so pressure contacted they tend to move towards the second pair of uprights, and in so doing force the balance of the stocks of drums into pressure frictional contact with the first and second drum retaining strips. The invention cooperates with the drums to provide a unitized assembly that may be lifted on or removed from a flat bed of a vehicle by a fork lift truck. The fork lift engageable position of the invention may have a tie down extended therethrough to removably secure a carriage to the bed of the supporting vehicle.

BRIEF DESCRIPTION OF THE DRAWING

FIG. 1 is a perspective view of the fork lift engageable carriage with stocks of drums mounted and removably locked thereon to provide a unitized assembly that may be mounted on or removed from a flat bed vehicle by a fork lift truck;

FIG. 2 is an elevational view of the second end of the carriage;

FIG. 3 is a side elevational view of one of the toggle mechanisms;

FIG. 4 is a top plan view of the carriage and drums;

FIG. 5 is a transverse cross-sectional view of one of the toggle mechanisms taken on the line 5—5 of FIG. 3;

FIG. 6 is a perspective view of the unitized assemblies removably supported on a flat bed of a vehicle; and FIG. 7 is a transverse cross-sectional view of the vehicle bed and the retaining apparatus that may be used to secure two of the drum supporting carriages thereto.

DESCRIPTION OF THE PREFERRED EMBODIMENT

The carriage A as best seen in FIGS. 1, 2 and 4 includes a flat rectangular base B on which a number of drums D may be stacked to define rows and columns thereof. Base B has a top surface 10 and bottom surface 12. Two longitudinally spaced, transversely extending channels 14 are welded to the bottom surface 12 and are centrally located thereon. The two channels 14 are so spaced as to define two transversely extending spaces 14a that may be engaged by a fork lift truck (not shown) to permit the carriage A to be lifted and transported. A pair of transverse channels 16 are secured to the ends of bottom surface 12. The channels 14 and 16 cooperate to provide a firm footing for the base B when the latter is resting on the ground or the flat bed C of a vehicle as shown in FIG. 6. The channels also provide means as will later be explained to removably lock the carriage A to the flat bed C when the drums D are being transported by the vehicles E of which the flat bed C forms a part.

Base B includes first and second ends 18 and 20 and first and second sides 22 and 24 as shown in FIGS. 1 and 2. A pair of laterally spaced uprights 26 are secured to the base B adjacent the first end 18 thereof. A second pair of laterally spaced uprights 28 are secured to the base B adjacent the second end 20 thereof.

One or more third pair of laterally spaced uprights 30 are secured to the sides 22 and 24 of base B in intermediate positions between the first and second pairs of uprights 26 and 28 as shown in FIG. 1.

A number of pairs of first vertically spaced, longitudinally extending, drum retaining strips 32 are secured to the pairs of uprights 26, 28 and 30 as shown in FIG. 1. The second pair of uprights 28 has a number of vertically spaced second drum retaining strips 34 extending therebetween and secured thereto by welding or the like. The upper ends of the first pair of uprights 26 are preferably connected by rigid transverse reinforcing members 36 as is also true of one of the third pair of uprights 30.

A number of chains 38 are provided that are defined by interconnected links 38a. Each chain 38 has a first end 40 and second end 42. The first ends 40 are rigidly secured to the first retaining strips 32 situated above the first side 22 of base B and adjacent one of the first uprights 26. The major portions of the chains 38 are preferably enveloped in pliable sheaths 44.

Each of the first drum retaining steps 32 situated above the second side 24 of base B has a toggle mechanism E mounted thereon adjacent one of the first upright 26. Each toggle mechanism E includes two laterally spaced, inverted L-shaped lugs 46 secured to a first drum retaining strip 32 as shown in FIG. 1. An elongate rigid handle 48 is provided for each toggle mechanism E. Each handle 48 is defined by two parallel flanges 50 that are connected by a web 52. A pair of pins 54 extend inwardly from the forward portions of the lugs 46 and pivotally engage the flange 50. A cross member 56 extends between the flanges 50 and is situated rearwardly and above the pins 54 when the handle 46 is pivoted from a downwardly depending first position to the second position shown in FIG. 1. An elongate hook 58 is pivotally supported from the cross member. An L-shaped stop 60 is secured to the rearward portion of lugs 46 to prevent toggle E being pivoted counterclockwise beyond the position shown in FIG. 3.

The use and operation of the carriage A is extremely simple. The carriage A is transported to a desired location by a lift truck (not shown) and deposited on the ground or other flat surface. Empty drums D are now moved through the first pair of uprights 26 and arranged on the base B in the forms of rows and columns to define the stacked configuration as shown in FIG. 1. After the drums D are stacked in abutting contact on base B as shown in FIG. 1, the chains 38 are drawn transversely between the first pair of uprights 26, and end links 38a thereof caused to engage hooks 58 when handles E are substantially normally disposed to drum retaining strips 32.

The toggles E are now pivoted to positions substantially parallel to drum retaining strips 32 as shown in FIG. 3, with the hooks 58 being moved forwardly relative to the first pair of uprights 26 as such movement takes place. The transversely disposed chains 38 and sheaths 44 are forced into pressure contact with the stacked drums D most adjacent thereto, and tend to force these drums forwardly on the base B. The drums D are opposed against the reinforced strip 34 with retaining strip 32 serving primarily as a guide rail. By way of the tendency of drums D to move forwardly the drums are forced into contact with retaining strip 34, to incorporate the structure of the drums into a unitized assembly on the carriage A. The tension generated through toggle locks further advances the drums into a single unit thus reducing structural requirements in the carriages while eliminating drum movement.

The carriage A and the stacked drums D may now be engaged as a unitized assembly by the forks of a lift truck engaging the transverse openings 14a, with the carriage and drum then being deposited on a flat bed of a vehicle F as shown in FIG. 6. A number of hand operated winches G that have reels 64 are provided, with the reels being rotatable by handles 68. The reels may be held in non-rotatable positions by pivotally supported dogs 66 that may be selectively placed in engagement with a ratchet wheel 67 secured to the reel 64. The winches G may be either permanently or temporarily attached to a side 62a of the bed 62.

A pair of transversely aligned carriages A when assembled on the truck flat bed 62, as shown in FIG. 7, are affixed to the bed by way of a flat bar 70 that extends transversely through the openings 14a.

The bar 70 has eyes 72 and 74 on opposite ends thereof. The bed 62 includes two transversely spaced longitudinally extending first and second beams 76 and 78 as shown in FIG. 7. An eye 80 is secured to beam 76 and engages a link 82 secured to a first end of a cable 84 that has a hook 86 secured to the opposite end thereof. Hook 86 may removably engage eye 72 after bar 70 is extended through space 14a.

The eye 74 may be removably engaged by a hook 88 secured to a free end of a cable 90, which cable has the opposite end secured to the reel 64. By rotating the reel 64 by handle 68 the cable 90 is tensioned, and the bar 70 serves as a tie-down to hold a pair of transversely aligned carriages A on the bed 62. Dog 66 when placed in engagement with ratchet wheel 67 prevents inadvertent rotation of reel 64.

When the reels 64 are rotated in an appropriate direction the cables 66 and transverse tie-down bar 70 are tensioned to removably hold the carriages A and drums D in a fixed position on the flat bed 62 of vehicle F for transportation to a desired destination. After the destination is reached, the above described operation is reversed to free the drums D for a desired use.

The structure and operation of the invention have been explained previously in detail and need not be repeated.

I claim:

1. A fork lift engageable carriage on which a plurality of stacks of cylindrical drums are removably disposed to permit said carriage and drums to be transported as a unitized assembly, whcih fork lift engageable carriage includes:

a. a flat rectangular rigid base that has an upper surface and a bottom surface, first and second ends, and first and second sides;

b. transverse fork lift engageable means secured to said bottom surface;

c. first and second pairs of transversely spaced uprights that extend upwardly from said base adjacent said first and second ends thereof;

d. a plurality of vertically spaced pairs of first drum-retaining strips that extend longitudinally between said first and second pairs of uprights and rigidly secured thereto with each of said pairs of first drum-retaining strips being so vertically spaced above said base as to be adjacently disposed relative to an intermediate side wall section of one of said drums in one of said stacks;

e. a plurality of vertically spaced second drum-retaining strips that extend transversely between said second pair of uprights secured thereto with each of said second drum-retaining strips being so vertically spaced above said base as to be in contact with intermediate side wall sections of said drums most adjacently disposed relative thereto;

f. a plurality of vertically spaced elongate members that have first and second ends with said first ends being disposed in fixed positions relative to said first upright most adjacent to said first side of said base, said members being so vertically spaced that they contact intermediate wall sections of said drums in said stocks most adjacent said first end of said base when said members are transversely disposed; and g. a plurality of vertically spaced first means disposed in fixed positions relative to said first upright most adjacent said second side of said base, with each of said first means being capable of removably engaging one of said second ends of said members, with each of said first means when actuated, tensioning the one of said members associated therewith, with each of said members when tensioned pressure contacting said drums in said stacks most adjacent thereto to tend to force said drums towards said second pair of uprights, and said drums as they tend to move towards said second pair of uprights tending to move said drums situated intermediate therebetween towards said second pair of uprights, and with said drums being forced into pressure contact with one of said pairs of first drum-retaining strips and one of said second retaining strip to be gripped therebetween in a fixed position relative to said base to permit said unitized assembly to be transported to a desired destination.

2. A fork lift engageable carriage as defined in claim 1 which further includes:

h. at least one intermediate pair of transversely spaced uprights that extend upwardly from said base intermediate said first and second ends thereof, with said intermediate pair of uprights having said pairs of first drum-retaining strips rigidly secured thereto.

3. A fork lift engageable carriage as defined in claim 2 which further includes:

g. reinforcing means that extend transversely between said first pair of uprights and said intermediate pair of uprights at a height above said base being greater than the height of the upper ends of the uppermost drums in said stocks, said reinforcing means tending to prevent lateral movement of upper portions of said pair of first uprights with a pair of intermediate uprights when said drums in said stacks are subjected to a force that tends to move them towards said second pair of uprights as said first means tensions said elongate members.

4. A fork lift engageable carriage as defined in claim 1 in which said members are chains defined by interconnecting links.

5. A fork lift engageable carriage as defined in claim 1 wherein the major portions of said chains are covered with a pliable protective sheath that prevents said chains from defacing the exterior surfaces of said drums when said chains are tensioned into pressure contact with said drums adjacent thereto.

6. A fork lift engageable carriage as defined in claim 1 that is capable of being removably tied onto the upper surface of a flat bed of a vehicle which bed includes first and second longitudinal sides, an assembly for removably securing said carriage to a flat bed of a vehicle on which said carriage rests, said bed having first and second transversely spaced longitudinally extending sides, said assembly including:

h. an elongate member that is removably disposed in said fork lift engageable means, said member having first and second ends;

i. first and second eyes on said first and second ends;

j. a first cable that has first and second ends, said first end secured to said first side;

k. a first hook secured to said second end, said first hook removably engaging said first eye;

l. a reel rotatably supported on said first side;

m. first means for rotating said reel;

n. a second cable that has first and second ends, said first end secured to said reel;

o. a second hook on said second end of said cable, said second hook removably engaging said second eye; and p. second means for preventing said reel from rotating after said reel has been rotated by said first means to tension said first and second cables for said elongate member to removably tie said carriage to said bed.

7. A fork lift engageable carriage as defined in claim 1 in which said first means is a manually operatable crank secured to said reel.

* * * * *